Figure 1:
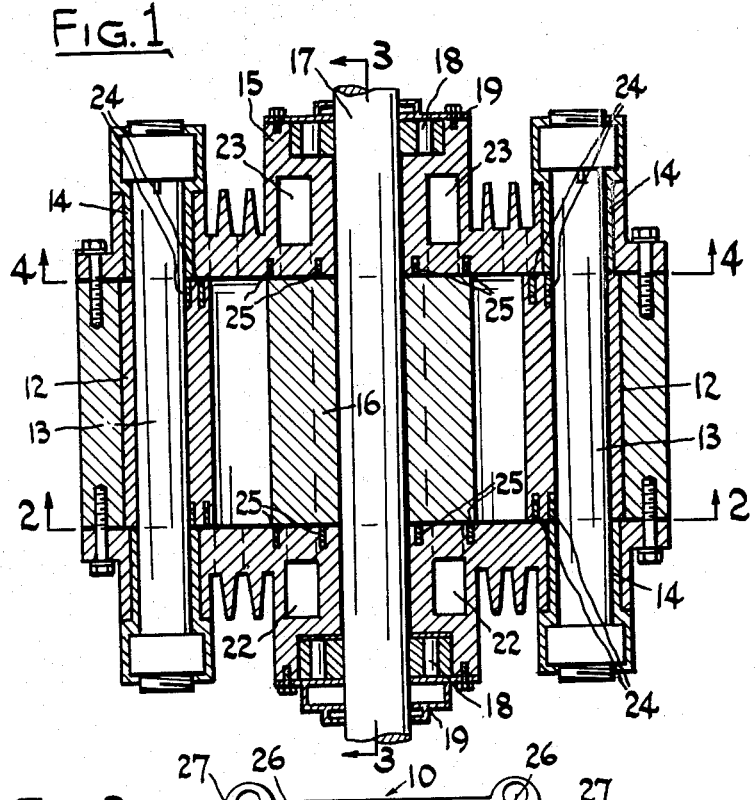

June 1, 1965 H. WALKER 3,186,385
ROTARY INTERNAL COMBUSTION ENGINES
Filed Sept. 8, 1961 6 Sheets-Sheet 1

INVENTOR
HAMILTON WALKER
BY Irwin S. Thompson
ATTORNEY

June 1, 1965 H. WALKER 3,186,385
ROTARY INTERNAL COMBUSTION ENGINES
Filed Sept. 8, 1961 6 Sheets-Sheet 2

INVENTOR
HAMILTON WALKER
BY Irvin S. Thompson
ATTORNEY

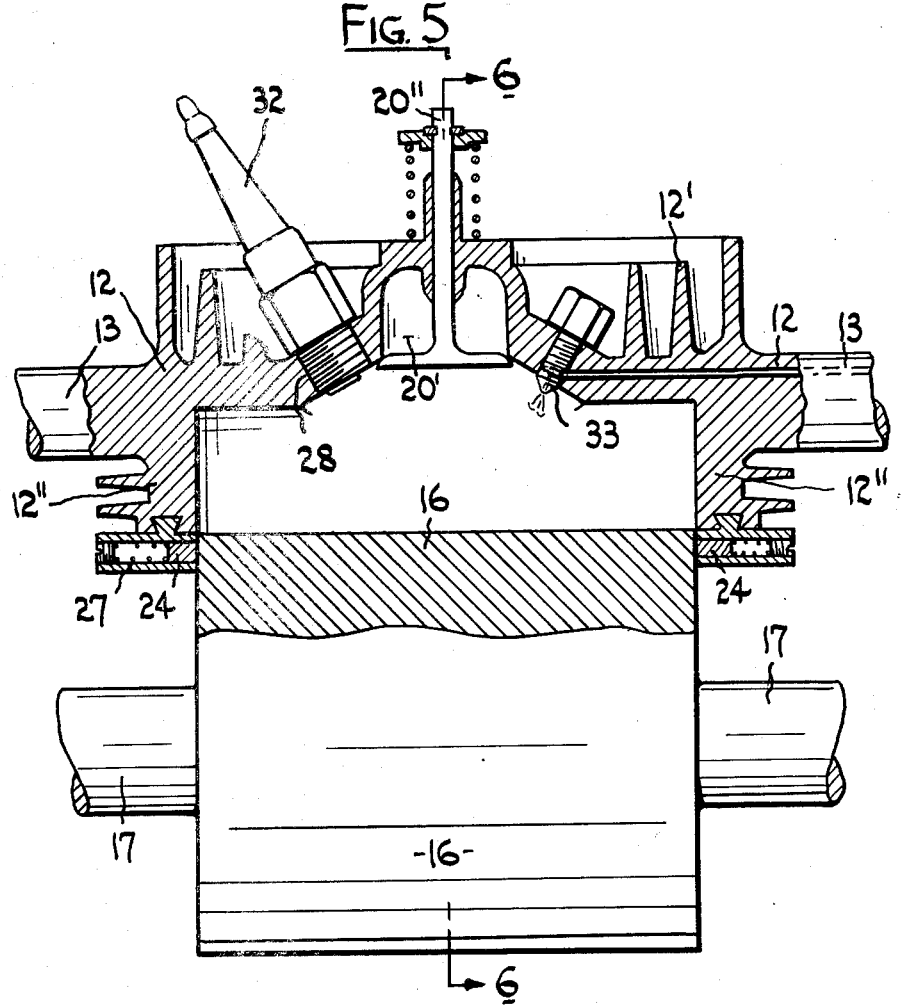

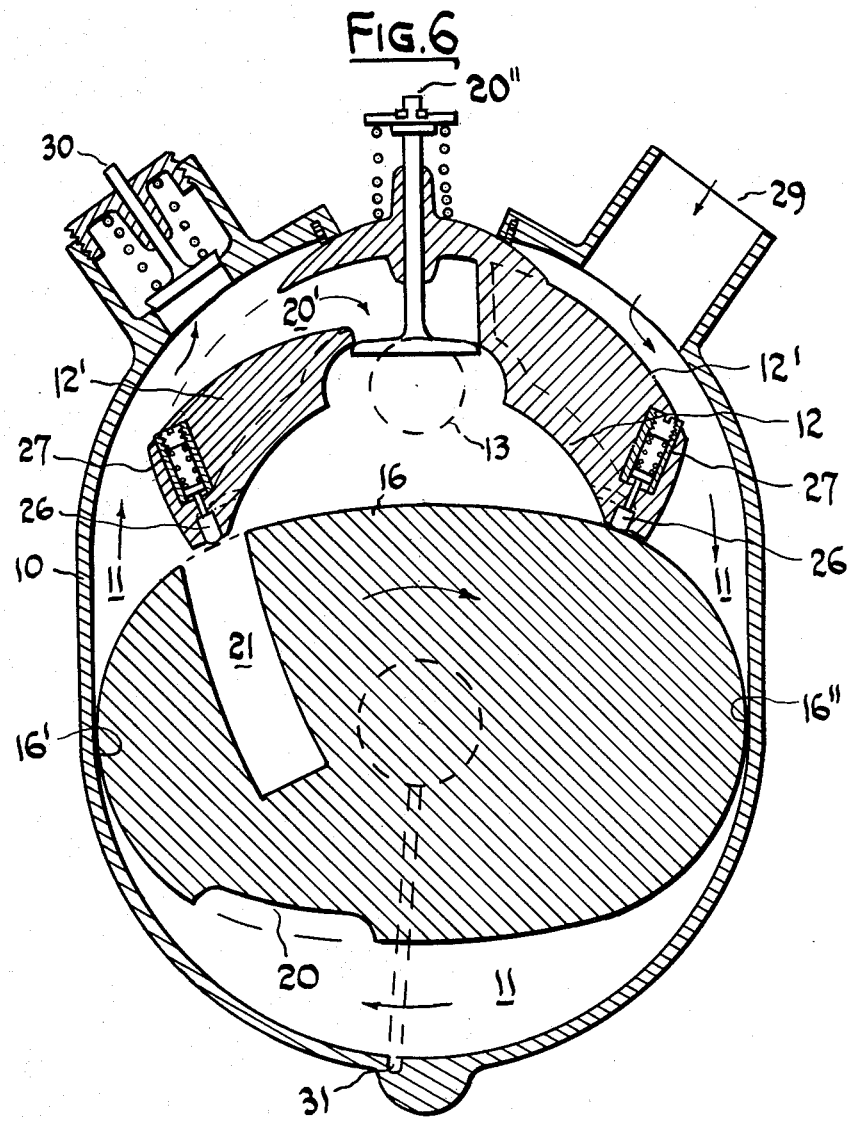

June 1, 1965  H. WALKER  3,186,385
ROTARY INTERNAL COMBUSTION ENGINES
Filed Sept. 8, 1961  6 Sheets-Sheet 5
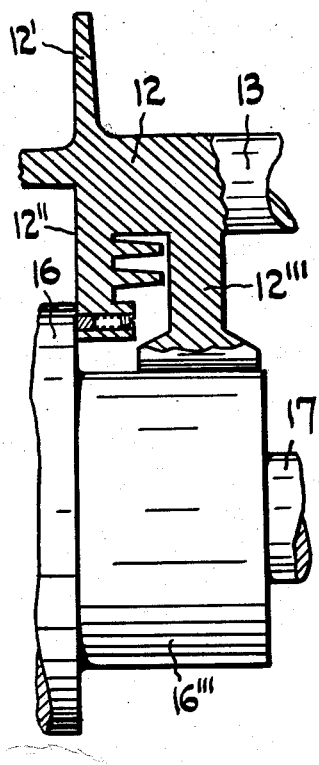
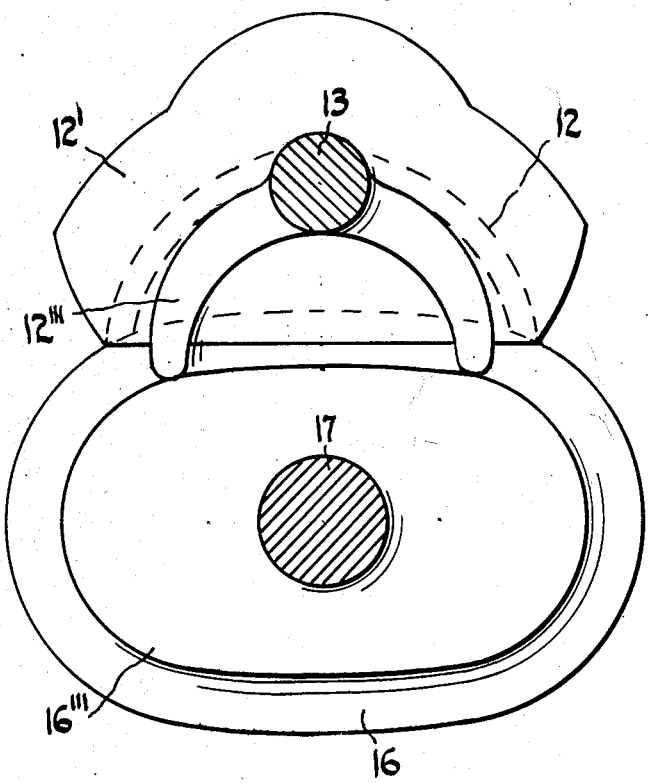
INVENTOR
HAMILTON WALKER
BY Irvin S. Thompson
ATTORNEY June 1, 1965  H. WALKER  3,186,385
ROTARY INTERNAL COMBUSTION ENGINES
Filed Sept. 8, 1961  6 Sheets-Sheet 6

INVENTOR
HAMILTON WALKER
BY Irvin S. Thompson
ATTORNEY

United States Patent Office 3,186,385
Patented June 1, 1965

3,186,385
ROTARY INTERNAL COMBUSTION ENGINES
Hamilton Walker, Whangarei, Auckland, New Zealand, assignor to Hamilton Walker Rotary Engines Limited
Filed Sept. 8, 1961, Ser. No. 137,487
Claims priority, application New Zealand, Sept. 20, 1960, 127,419
5 Claims. (Cl. 123—15)

This invention relates to rotary internal combustion engines.

Known types of rotary engines embody such a construction that they compress and fire the explosive charge between the rotor and the stator, or have a holding chamber from which the exploded mixture feeds onto the rotor.

An object of the present invention is to provide a rotary engine having a construction whereby an explosive charge will be located between a pivoted combustion head and the rotor. Other objects and advantages will hereinafter be apparent.

In one aspect the invention consists of a rotary internal combustion engine wherein a rotor is provided with two noses and a head is pivoted and shaped to provide with the periphery of the rotor a combustion chamber connectable with an intake and an exhaust, the construction and arrangement being such that in rotation of the rotor, the first nose thereof will move into the combustion chamber to scavenge exhaust gas and then draw in a fresh explosive charge, and then the second nose of the rotor will move into the combustion chamber to compress the charge and then on ignition effect a power stroke.

In a further aspect the invention consists of a rotary internal combustion engine comprising a stator, a rotor having two noses disposed within the stator, one or more heads pivoted in the stator and each of an arc shape with their ends engaging the periphery of the rotor to provide a combustion chamber, and an inlet and an exhaust connectable with each combustion chamber, whereby an explosive charge is located in the combustion chamber between a pivoted head and the rotor. This construction further includes the pivoted head spanning the rotor by substantially 90° and having a sealed contact with it, whereby only at the sides of the combustion area will the explosion touch the stator; and also having a cooling provision between stator and rotor.

Figure 2:
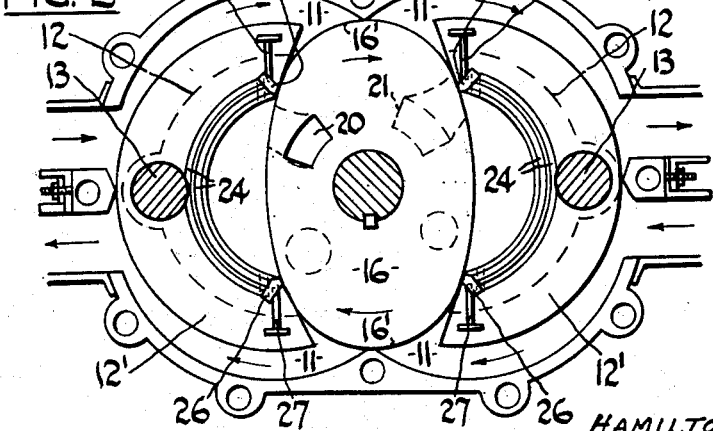
Figure 3:
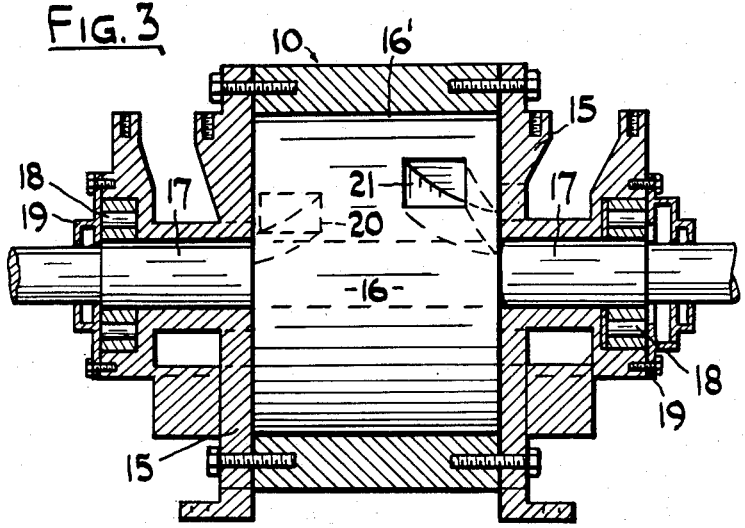
Figure 4:
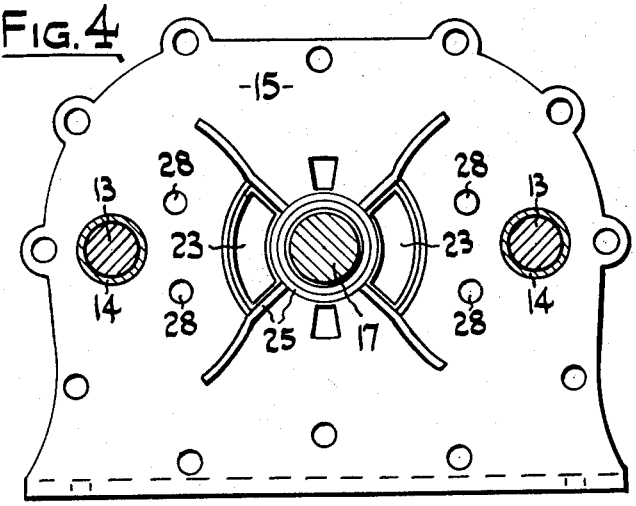
Figure 9:
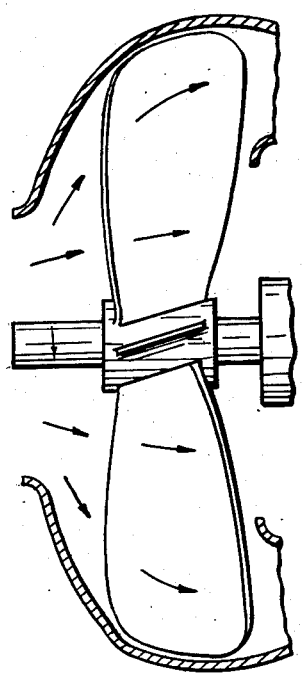
Figure 10:
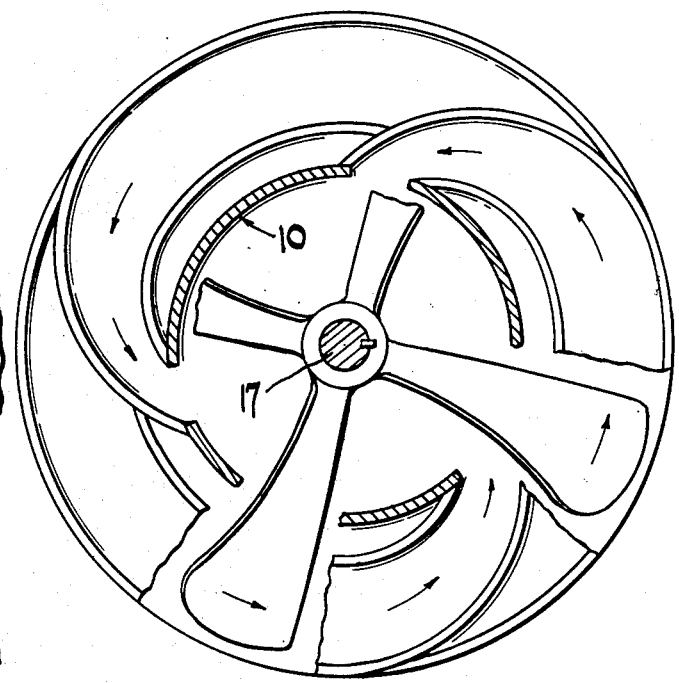

In further describing the invention, reference will be made hereinafter to the accompanying drawings, which are by way of example only; in such drawings:

FIGURE 1 is a sectional plan view,
FIGURE 2 is a side view as taken on the line 2—2 of FIGURE 1,
FIGURE 3 is a sectional end view as taken on the line 3—3 of FIGURE 1,
FIGURE 4 is a side view as taken on the line 4—4 of FIGURE 1, of a two combustion chambered type of the engine;
FIGURE 5 is a sectional end view and
FIGURE 6 is a sectional side view of main parts in a single combustion chambered type of the engine;
FIGURE 7 is a sectional end view and
FIGURE 8 is a sectional side view of portion of the rotor and a combustion chamber head; and
FIGURE 9 is a sectional end view and
FIGURE 10 is a sectional side view of an air cooling fan mounted on the drive shaft of the rotor.

In giving effect to the invention, as a preferred embodiment, the engine illustrated includes two pivoted heads and the shape of the stator casing 10 is governed thereby and also to provide space for the surrounding cooling chamber 11. Each head consists of a member 12 mounted on a spindle 13 journalled in bearings 14, which are mounted within the front and back plates 15 of the casing 10. Each member 12 is generally of arcuate or curved shape with its inner side relative to the axis of the rotor concaved and its ends adapted to engage and run on the outer and peripheral surface of the rotor 16. The span of this curved shape of the head member 12 covers approximately 90° of the rotor. The outer sides of the head member 12 are provided with fins 12', and the ends can be built in for fuel injection and heavy duty purposes if required.

The rotor 16 is in the form having two ends or double nosed cams 16', 16", which are of a shape similar to the inner side of each member 12. Rotor 16 is mounted on a drive shaft 17 extending through the center of the casing plates 15 and journalled in suitable bearings, such as roller bearings 18 mounted in the plates and enclosed by covers 19.

The rotor 16 is formed with an intake duct 20 and an exhaust duct 21 positioned to coincide during movement of the rotor with an intake channel 22 and an exhaust channel 23 formed in the respective casing plates. It may, however, be constructed with valves or a combination of port and valve.

For sealing, strips 24 are provided on each combustion chamber member around its sides and strips 25 on the casing. At the ends of the strips 24 are brushes 26 set against spring means 27. No sealing strips are required on the rotor.

For ignition, sparking plugs can be mounted through holes 28 in the plate having the intake channel 22 or two in each plate 15. In this two combustion chamber type of the engine with the ports of the channels controlled by the rotor 16, the firing order is one and then two alternately and functions as follows: The double nosed cam rotor 16 moves in a clockwise direction commencing with the first cam 16' opposite the first combustion chamber; commencing to turn with the inlet port open, the rotor moves around to over 100° before the intake port is closed. The second cam 16" of the rotor then approaches the first chamber and as it moves into such chamber, the rotor end compresses the charge.

When the rotor has moved approximately 180° further, it will then have compressed the charge which would then be ready for the spark to ignite. The force of the explosion would carry it forward approximately 80° before the exhaust port would be opened, and then the first end cam 16' of the rotor approaching the first chamber would force all the waste gases through the exhaust port.

The first cam also as it moves forward from the zero position, opposite the first chamber, when turned, the intake gas is drawn from the carburetor intake. The first cam 16' of the rotor then goes through the second firing chamber where it sucks the mixture into that chamber, and this completes the cycle.

For cooling this two combustion chamber type of engine, each nose of the rotor will be in the air cooling chamber 11 for approximately 180° per revolution to circulate the air through the air cooling chamber and for heavy duty work, a fan 34 (FIGURES 9 and 10) is mounted on the drive shaft 17 in the front of the engine to give additional cooling. This fan will also serve to cool exhaust outlet pipes in front of the engine which would be partly finned.

The cooling air passing around in the cooling chamber collects the fumes and the carburetors would suck in a portion, the remainder being fed into the exhaust system.

It will be appreciated that because the two separate cam noses 16', 16" operate in each combustion chamber it is possible to have a four cycle engine with the ports of a two cycle engine. It has the advantage of four cycles, but also more than the advantages of two cycles as well, for port opening and closing periods are not restricted. One side of a nose of the rotor has control of the intake port and the other side, the exhaust port. Not only can the ports be kept open long enough for maximum efficiency but they are not restricted to normal size. The engine can be run at high revolutions and still maintain high torque.

Reference is now made to FIGURES 5 and 6 which illustrate another embodiment of the invention wherein the engine contains a single combustion chamber. In this embodiment, there will be one spark every revolution produced by spark plug 32. For cooling, part of the rotor is outside in the air cooling chamber for 270° to cool itself as well as to circulate air over the fins on the outside of the combustion head. The rotor 16 is formed with an intake channel 20 and an exhaust duct 21 as in FIGURE 6, when this model is used for fuel injection only. The rotor has an exhaust duct only if used with a carburetor, the intake valve then being set on top of the combustion head as indicated at 20" in FIGURE 5. With fuel injection, both intakes for air, channel 20, and valve 20" may be used. The necessary fuel injector nozzle is shown at 33 in FIGURE 5.

When the first rotor nose 16' starts from the zero position (i.e., the vertical position of FIGURE 6), it enters inside the combustion head 12. While it moves around for approximately 100°, the intake channel 20 and/or valve 20" is open, allowing the air for fuel injection or the mixture from a carburetor to fill the combustion chamber. The second rotor nose 16" then moves into the combustion head and compresses the fuel mixture, the rotor now having turned another 180°. On ignition, the power stroke forces the rotor around another 80°, approximately, before the exhaust port 21 opens and the nose 16' again moving into the combustion chamber forces the waste gases out. When the nose 16' is vertical once more, having moved 360°, the cycle for intake, compression power and scavenging is complete.

In FIGURE 6, the cooling air is drawn in through the pipe 29 into the cooling chamber 11 and circulated in a clockwise direction by the rotor noses 16' and 16" through the fins 12' on the right hand side of the combustion head and then down through the lower part of chamber 11 where the air is completely displaced twice every revolution. The air is then forced up through the fins on the left hand side of the combustion head and, if supercharging is not required, the valve 30 with its spring is removed and the air moved out unrestricted. For supercharging, the guide for valve 30 can be screwed in or out to tension the spring so as to give the desired supercharging pressure. The air is also forced into the combustion chamber through channel 20 and valve 20" if used, to go with fuel injection.

The engine shown in FIGURES 5 and 6 requires only four sealing strips or brushes, including the two strips 24 located in the sides of the combustion head and the two strips 26 in the ends. These four seals are spring loaded, as shown at 27.

Oiling for a start would be via the fuel. Any oil gravitating down from the rotor an combustion head into the lower stator housing is collected in a groove 31 and forced by the cooling air up through a hole in each side plate to the sides of the rotor next to the shaft, to be distributed by centrifugal force, thus giving good oiling of both rotor sides.

In this four stroke feul injector engine as shown in FIGURES 5 and 6, the rotor 16 performs the duties of: (1) two pistons, (2) cooling fan, (3) flywheel, (4) rotary intake channel, (5) rotary exhaust port, (6) supercharger, (7) oil pump, and (8) combustion head rocker cam.

FIGURES 7 and 8 illustrate a rotor which is reduced in size and which provides a cam drive on one side of the built-in combustion chamber head. In these two figures, the extended edges of the combustion chamber head 12''' are arranged to run on the periphery of the extended rotor 16''', giving a rocking motion to this head. This construction is particularly useful in preventing undue wear on the sealing brushes 26, since it removes the pressure from brushes 26. Other advantages are lower surface speeds and cooler operating conditions.

FIGURES 9 and 10 illustrate the aforementioned fan 34 mounted on drive shaft 17 to force cooling air around through the cooling chamber over the rotor and the combustion chambers. The fan 34 cools the exhaust manifold ducts 23, but it is a necessity only for the engine having three combustion heads. FIGURE 10 shows the side of the fan next to the engine and as viewed from within the engine.

Where the engine has three combustion chambers per rotor with ports, the firing order would be 1, 2, 3 and if it has valves, the more efficient firing order would be 1, 3, 2. In this type of the engine, as the rotor would not largely aid in cooling, a fan mounted as before mentioned would do the main part of the cooling.

In all types of the engine, for extra cooling or for lightness, the rotor can have a portion of its center hollowed and spoked off if required, and a grill provided on the casing on both sides.

Finally a high degree of efficiency and economy can be obtained with a fuel injection model having only one combustion chamber head per rotor with sides built-in, and the end between the rotor and the stator casing used for supercharging and cooling.

Having now described my invention, what I claim is:

1. A rotary internal combustion engine comprising a stator casing, a drive shaft journalled to extend centrally through the casing, a rotor having two noses mounted on the drive shaft, an explosive charge entry means mounted in the housing, an igniting means mounted in the casing, at least one head pivoted in the casing, each head having an arcuate shape and being centrally mounted on a spindle journalled to extend through the casing, each head having ends that engage in a continuous sealed contact with the periphery of the rotor at a location of the explosive charge entry means and the igniting means to provide a combustion chamber formed inside the arcuate shape of the head, an inlet and an outlet provided in the casing connectable with the combustion chamber and an intake duct and an exhaust duct positioned in the rotor to coincide, during movement of the rotor, respectively with the inlet and the exhaust in the casing for timed entry and discharge of a charge in the combustion chamber, whereby on rotation of the rotor one nose of the rotor will move into the combustion chamber to scavenge exhaust gas and then draw in a fresh explosive charge and then the second nose of the rotor will move into the combustion chamber to compress the charge and then on exploding effect a power stroke.

2. A rotary internal combustion engine as claimed in claim 1, and further comprising an air cooling chamber located within the stator casing, each nose of the rotor being positioned in the cooling chamber for approximately 180° in a revolution of the rotor to cause air to circulate through the cooling chamber.

3. A rotary internal combustion engine as claimed in claim 1 and further comprising an air cooling chamber located between the inside of the stator casing, the outside of the pivoted heads and the periphery of the rotor, whereby upon rotation of the rotor, air is caused to flow through the cooling chamber.

4. A rotary internal combustion engine as claimed in claim 1, wherein the sealed contact consists of sealing strips located around the edges and at the ends of each pivoted head, and sealing strips on the inside of the stator casing.

5. A rotary internal combustion engine, comprising a stator casing, a rotor mounted for rotation in the casing about a first axis, the rotor having two noses extending in opposite directions from said first axis, a head mounted for oscillation in the casing about a second axis spaced from and parallel to said first axis, said head having a concave face which confronts the rotor and whose opposite ends seal against the periphery of the rotor to define between said face and said periphery a combustion chamber bounded at its ends by said casing, means for introducing fuel into said combustion chamber, means for igniting fuel within the combustion chamber, and means for exhausting burned fuel from the combustion chamber.

References Cited by the Examiner

UNITED STATES PATENTS

| | | | |
|---|---|---|---|
| 859,474 | 7/07 | Williams | 123—15 |
| 947,430 | 1/10 | Jagersberger et al. | 123—14 |
| 1,145,161 | 7/15 | Mears | 123—15 |
| 1,216,378 | 2/17 | Thomas | 123—15 |
| 1,942,428 | 1/34 | Hutchison | 230—149 |
| 2,084,846 | 6/37 | Hutchison | 121—78 |
| 2,175,265 | 10/39 | Johnson | 123—8 |
| 2,214,833 | 9/40 | Hocker | 123—14 |
| 2,808,813 | 10/57 | Lindhagen et al. | 123—8 |

FOREIGN PATENTS

| | | |
|---|---|---|
| 422,107 | 1/35 | Great Britain. |
| 463,987 | 6/51 | Italy. |

KARL J. ALBRECHT, *Primary Examiner.*

RALPH H. BRAUNER, JOSEPH H. BRANSON, JR.,
*Examiners.*